(12) United States Patent  
Edwards et al.

(10) Patent No.: US 7,522,038 B2
(45) Date of Patent: Apr. 21, 2009

(54) EMERGENCY CONTACT SYSTEM AND METHOD

(75) Inventors: Kenneth Lee Edwards, McCordsville, IN (US); Bryan Lee Goossen, Indianapolis, IN (US); Carrie Klockow Woodruff, Indianapolis, IN (US)

(73) Assignee: Stericycle, Inc., Lake Forest, IL (US)

( * ) Notice: Subject to any disclaimer, the term of this patent is extended or adjusted under 35 U.S.C. 154(b) by 328 days.

(21) Appl. No.: 11/214,227

(22) Filed: Aug. 29, 2005

(65) Prior Publication Data

US 2007/0046456 A1    Mar. 1, 2007

(51) Int. Cl.
G08B 1/08 (2006.01)
(52) U.S. Cl. ............... 340/539.1; 340/573.1; 340/519; 340/825.49
(58) Field of Classification Search ............ 340/539.1, 340/519, 534, 573.1, 540, 825.49, 825.45; 709/200, 206, 217, 218
See application file for complete search history.

(56) References Cited

U.S. PATENT DOCUMENTS

| | | | |
|---|---|---|---|
| 5,835,907 A * | 11/1998 | Newman | 707/10 |
| 5,933,080 A | 8/1999 | Nojima | |
| 6,002,748 A | 12/1999 | Leichner | |
| 6,104,799 A | 8/2000 | Jain et al. | |
| 6,151,385 A | 11/2000 | Reich et al. | |
| 6,295,346 B1 | 9/2001 | Markowitz et al. | |
| 6,442,241 B1 | 8/2002 | Tsumpes | |
| 6,463,462 B1 * | 10/2002 | Smith et al. | 709/206 |
| 6,816,878 B1 * | 11/2004 | Zimmers et al. | 709/200 |
| 2002/0107927 A1 * | 8/2002 | Gallant | 709/206 |
| 2002/0159570 A1 | 10/2002 | Langsenkamp et al. | |
| 2004/0006694 A1 * | 1/2004 | Heelan et al. | 713/168 |

FOREIGN PATENT DOCUMENTS

JP    2003101674    4/2003

OTHER PUBLICATIONS

"Emergency Communication Solutions," Roam Secure Alert Network, www.roamsecure.net.

* cited by examiner

*Primary Examiner*—Daniel Previl
(74) *Attorney, Agent, or Firm*—Matthew R. Schantz; Bingham McHale LLP

(57) ABSTRACT

A system and method for managing crisis communication are disclosed. A contact database holds information used to deliver broadcast messages to selected contacts. Messages are prepared in advance for delivery via different channels, including voice, fax, pager, and e-mail. Contact groups are defined by selecting specific contacts, or as "criteria groups" defined by search criteria. Notification tasks are created by determining the contact groups to receive the broadcast, then adding others if desired. Messages are selected for broadcast transmission in various channels. Administrators view a table of status codes for each attempted transmission. They filter the table based on each contact's status. Contacts or filtered sets can be added to and removed from a "renotification" list using the interactively filtered table. When contacts fail to confirm or update their contact information for longer than a certain period, the system automatically sends that contact a message reminding them to do so.

12 Claims, 25 Drawing Sheets

Contact Management

ID 1234567

Prefix Mr.

First Paul

MI P

Last Greatbatch

Title Creative Marketing Manager

Department communications

Company NNC Group

Work Phone 317-860-1191  Ext

Work Fax 317-636-9827

Mobile Phone 317-408-4896

Work Email paul.greatbatch@nncgroup.com

— 210

Contact Type Employee

Territory Midwest

Custom 4

Custom 5

— 220

Notification Options
- ☒ Work Phone
- ☒ Mobile
- ☒ Home Phone
- ☐ Work Fax
- ☐ Work Email
- ☐ Home Email

— 230

[Confirm/Save] — 250

[ Company ] [ Personal ] [ Emergency ] [ Supervisor ]

Address 1  2670 Executive Drive

Address 2  Suite A

City  Indianapolis

State  IN  Province/Territory

Postal Code 46241-1431

Country United States

— 240

[Confirm/Save] — 255

Contact Management

Search | New

Contact | Groups | Messages | Notifications | Reports | Admin | NNC | Info

ID: 1234567

Prefix: Mr.
First: Paul
MI: P
Last: Greatbatch
Title: Creative Marketing Manager
Department: communications
Company: NNC Group
Work Phone: 317-860-1191  Ext:
Work Fax: 317-636-9827
Mobile Phone: 317-408-4896
Work Email: paul.greatbatch@nncgroup.com Contact Type: Employee
Territory: Midwest
Custom 4:
Custom 5:

Notification Options
[X] Work Phone
[X] Mobile
[X] Home Phone
[ ] Work Fax
[ ] Work Email
[ ] Home Email Confirm/Save

Company | Personal | Emergency | Supervisor | Administration — 345

Name: Susan Thompson
Home Phone: 317-251-0661
Work Phone: 317-575-8800
Mobile Phone: 317-408-5236

Name: Ron Brock
Home Phone: 317-255-4767
Work Phone: 317-705-5105
Mobile Phone: 317-509-4767

Confirm/Save

Fig. 5

Contact Management

Search | Contact | Groups | Messages | Notifications | Reports | Admin | Info

New

ID 1234567
Prefix Mr.
First Paul
MI P
Last Greatbatch
Title Creative Marketing Manager
Department communications
Company NNC Group
Work Phone 317-860-1191  Ext
Work Fax 317-636-9827
Mobile Phone 317-408-4896
Work Email paul.greatbatch@nncgroup.com Contact Type Employee
Territory Midwest
Custom 4
Custom 5

Notification Options
☒ Work Phone
☒ Mobile
☒ Home Phone
☐ Work Fax
☐ Work Email
☐ Home Email Company | Personal | Emergency | Supervisor | Administration

347

Name Ken Edwards
Department Communications
Work Phone 317-860-1192

Confirm/Save

Confirm/Save

Notifications

1. Create Lists → 2. Preferences → 3. Select Message → 4. Preview/Launch

Contact | Groups | Messages | Notifications | Reports | Admin

① Select Groups
- ○ User Preferences  ⦿ Override User Preferences   ○ All Channels
  - [Mobile ▽]
  - [Home Phone ▽]
  - [Work Phone ▽]
  - [Email ▽]

⎱ 471

② Voice Broadcast Preferences
- ☐ Allow 60 second reply?  ☒ Confirm receipt of message?  ☒ Retry Interval [15 ▽] Min.  ☒ Attempts [4 ▽]

⎱ 473

③ Name and Schedule of Notification

Enter a name for the event [Mobile]

⦿ Start broadcast immediately  ○ Month Day Year
  [▽] [▽] [▽]

Hour  Min.  AM/PM
[▽]  [▽]  [▽]  U.S. Eastern time zone

Current [     ]  U.S. Eastern time zone

⎱ 475

477 — [Back]    [Continue] — 479

Outbound Notification History Report

Click on the appropriate link for the report you wish to view. To stop a broadcast in progress, click Kill.

Outbound

| Name | Initiated (ET) | Status | Count | Messages | | |
|---|---|---|---|---|---|---|
| Vendor_drill | 12/01/2004 11:28 AM | Finished | 1201 | Listen Machine | View Fax | View Email |
| Hazmat_drill | 12/01/2004 12:23 PM | Finished | 600 | Listen Machine | View FAx | View Email |

Fig. 18

Outbound Summary Report

Hazmat_drill

Name: Hazmat_drill
Groups: Hazmat Operations
Initiated: 12/01/04 12:23 PM
Ended: 12/01/04 1:23 PM

Counts
Phone: 300
Fax: 100
Email: 100

Phone Results
Full: 200    66%
Full to Machine: 97    33%
Partial: 0    0%
Partial to Machine: 0    0%
No Answer: 0    0%
Busy: 0    0%
Network Busy: 0    0%
Bad Number: 0    0%
Modem: 0    0%
Bad Number: 3    1%

Total Attempts: 414

|  | Work Phone | Mobile Phone | Home Phone | Work Fax | Work Email | Home Email | Totals |
|---|---|---|---|---|---|---|---|
| Success | 99 | 99 | 99 | 97 | 95 | 95 | 584 |
| Partial |  |  |  |  |  |  |  |
| Failure | 1 | 1 | 1 | 3 | 5 | 5 | 16 |

Detailed Report Color Chart | Detailed Report Status Chart

Fax Results
Full: 97    97%
Partial: 0    0%
No Answer: 0    0%
Busy: 0    0%
Network Busy: 0    0%
Bad Number: 0    0%
Modem: 0    0%
Bad Number: 3    3%

Total Attempts: 163

Email Results
Delivered: 190    95%
Failed: 10    5%

Total Attempts: 200

Fig. 19

Outbound Detailed Report-Color Chart

Hazmat_drill

Name: Hazmat_drill
Groups: Hazmat Operations
Initiated: 12/01/04 12:23 PM
Ended: 12/01/04 1:23 PM

|  | Work Phone | Mobile Phone | Home Phone | Work Fax | Work Email | Home Email | Totals |
|---|---|---|---|---|---|---|---|
| + Success | 99 | 99 | 99 | 97 | 95 | 95 | 584 |
| ∞ Partial |  |  |  |  |  |  |  |
| • Failure | 1 | 1 | 1 | 3 | 5 | 5 | 16 |

| Name | Renotify All \| Clear | Work Phone | Mobile Phone | Home Phone | Work Fax | Work Email | Home Email |
|---|---|---|---|---|---|---|---|
| Aughinbaugh, Howard | ☒ | • | • | • | • | + | + |
| Berry, Ken | ☒ | + | + | + | • | + | + |
| Edwards, Ken | ☒ | + | + | + | • | + | + |
| Goossen, Bryan | ☒ | + | + | + | + | • | • |
| Greatbatch, Paul | ☒ | + | + | + | + | • | • |
| Olson, Jonathan |  | + | + | + |  | • | • |
| Rich, Jason |  |  |  |  |  |  | • |

Fig. 20

Outbound Detailed Report—Status Chart

Hazmat_drill

Name: Hazmat_drill
Groups: Hazmat Operations
Initiated: 12/01/04 12:23 PM
Ended: 12/01/04 1:23 PM

|  | Work Phone | Mobile Phone | Home Phone | Work Fax | Work Email | Home Email | Totals |
|---|---|---|---|---|---|---|---|
| + Success | 99 | 99 | 99 | 97 | 95 | 95 | 584 |
| ≈ Partial |  |  |  |  |  |  |  |
| • Failure | 1 | 1 | 1 | 3 | 5 | 5 | 16 |

| Name | Renotify All \| Clear | Work Phone | Mobile Phone | Home Phone | Work Fax | Work Email | Home Email |
|---|---|---|---|---|---|---|---|
| Aughinbaugh, Howard | ☒ | Bad Number | No Answer | Modem | Full | Delivered | Delivered |
| Berry, Ken | ☒ | Full | Full to Machine | Full | No Answer | Delivered | Delivered |
| Edwards, Ken | ☒ | Full | Full | Full | No Answer | Delivered | Delivered |
| Goossen, Bryan | ☒ | Full | Full | Full | Full | Failed | Failed |
| Greatbatch, Paul | ☒ | Full | Full | Full to Machine | Full | Failed | Failed |
| Olson, Jonathan |  | Full | Full | Full | Full | Failed | Failed |
| Rich, Jason |  |  |  |  |  |  |  |

EMERGENCY CONTACT SYSTEM AND METHOD

FIELD OF THE INVENTION

The present invention relates to emergency communications. More specifically, the present invention relates to a system and method for preparing for and executing communications with a group of people in the event of an emergency or similar situation.

BACKGROUND

The invention relates generally and primarily to systems for disseminating information in the event of a crisis or emergency, such as when severe weather strikes or hazardous materials are released. Existing systems for managing communications during a crisis focus on broad dissemination of a message, but fail to provide adequate tools for easy administration of a system before the crisis arises, and tools for ensuring delivery of the desired message(s) after the crisis arises.

There is thus a need for further contributions and improvements to crisis communication management technology.

SUMMARY

It is an object of the present invention to provide improved tools to manage mass communication in the event of a crisis. It is another object of the present invention to facilitate preparation for such an eventuality and execution of a plan for communication in such events.

These objects and others are achieved by various forms of the present invention. One form of the present invention is a crisis message broadcasting system and method that enables administrators to view and filter a list of recipients in real time based on the success, partial success, or failure of communication in one or more particular communication channels, then to attempt again to contact those in the filtered list. In a variation of this embodiment, the list reflects type of error when a communication error occurs, and the administrator can filter based on those error types.

Another form is a crisis message broadcasting system and method in which administrators can create groups of contacts in advance of an emergency by establishing criteria to be applied to fields (including user-defined fields) in a contact database. In some embodiments of this form, these criteria are simply applied to create a list when a crisis arises, and in some embodiments the resulting list can be modified by adding and/or removing contacts from the list before the emergency communications are sent.

In another form, the crisis message broadcasting system and method enables administrators to store documents for sending through various channels in the event of an emergency. In some embodiments of this form, a message is recorded for sending via an audio channel (such as a voice/telephone line or voice messaging system), while another is saved for sending via a text channel (such as by instant messaging, paging, fax, or e-mail).

Still another form includes a method by which administrators can maintain current contact information by having the system automatically send a reminder message to a contact if he or she has not updated or confirmed his or her emergency contact information for a certain period of time, then initiating additional action if the confirmation or update is not completed within an additional period of time. In some embodiments of this form, the message to each delinquent user is generated by a periodic query of the database, wherein each delinquent user is automatically sent a message specified by an administrator.

BRIEF DESCRIPTION OF THE DRAWINGS

FIGS. 2-25 are simulated screen shots of a user interface in a system according to the embodiment in FIG. 1.

DESCRIPTION

Figure 1:
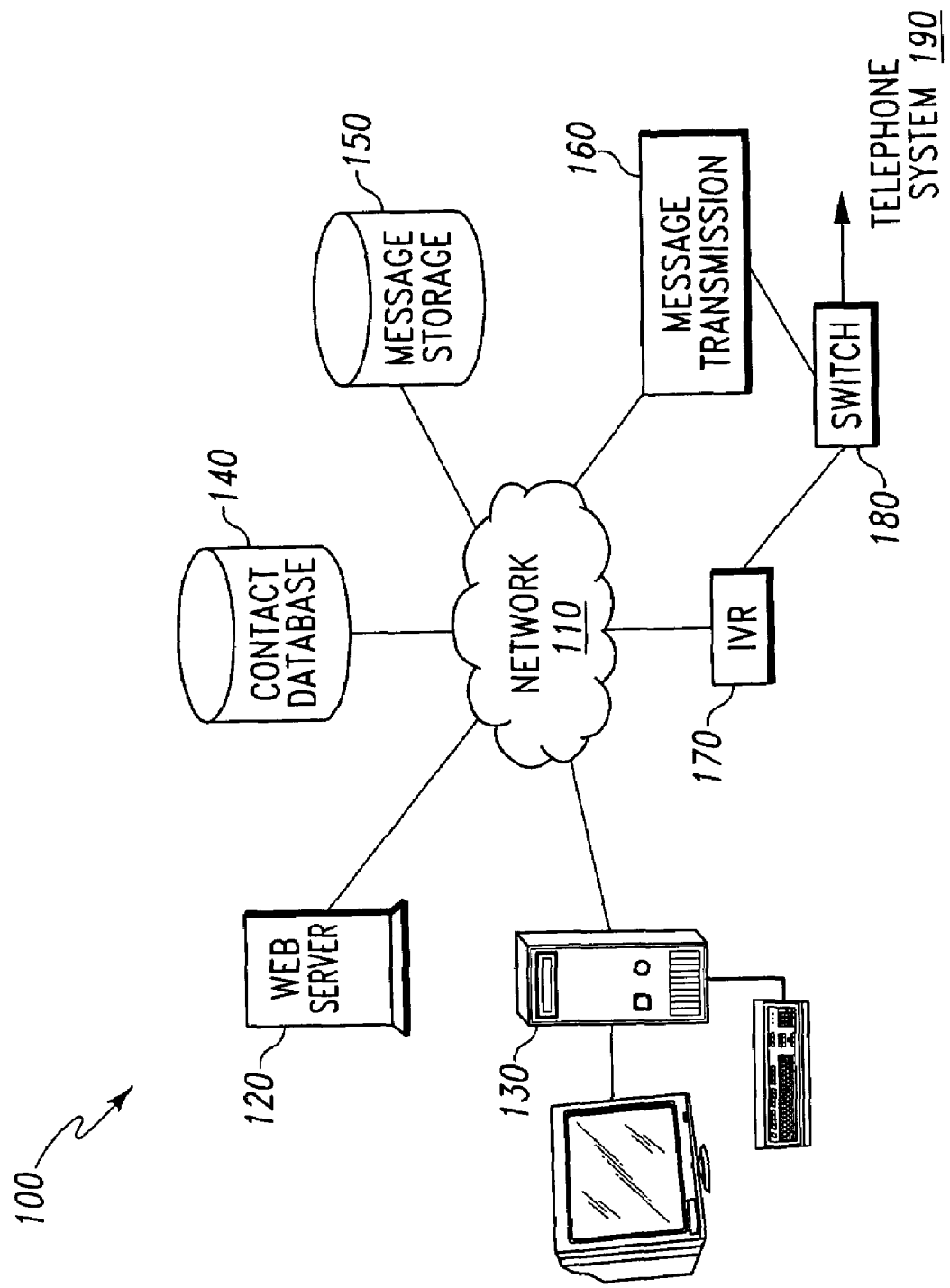
FIG. 1 is a block diagram of a messaging system according to one embodiment of the present invention.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, one form of the present invention is an emergency communication system that uses a database of emergency contact information, such as for a company's employees and principal affiliates. Messages are created to deal with crises, the risk of which is foreseen, for communication via several messaging channels (also "communication channels" herein). Groups of contacts to which messages may need to be sent are created based on database criteria and are saved. When a crisis occurs, an administrator selects a pre-recorded message (or creates a new one) for sending to a group of contacts previously defined by criteria (to which contacts may be added or from which they may be removed). As the message is being distributed, an administrator (i.e., a user having the authority or ability to do so) can monitor the progress of the broadcast on a per-contact basis, filtering a list of contacts based on the completion status of communications to that person in one or more particular communication channels. A "Renotify list" can be generated by selecting and/or deselecting contacts from filtered lists, and selected contacts may be sent additional messages. Contacts can state a preference for being contacted via a particular communication channel, and that preference may either be respected or overridden by the system as the administrator instructs.

Turning now to FIG. 1, system 100 includes several components interconnected via a network 110, which may be wired or wireless, or a combination of both, and may include networks and subnetworks owned by one or many parties. Some of the connections depicted as being via network 110 are shared in various embodiments, and may be made directly between devices, via LAN or WAN, or via some other channel for communication between such devices to effectively transfer data from one device to another.

In this embodiment, web server 120 provides an HTML interface for use by various administrative users via a traditional web browser, though other interfaces may be used within the spirit of this invention. An administrator uses PC 130 to access web server 120 and set up contact database 140. This database stores and provides emergency contact and identifying information for a group of persons and/or companies ("contacts" herein). Use and maintenance of contact database 140 is discussed in further detail below.

The system 100 also stores messages for broadcast in message storage device 150, which in the present embodiment is also connected to network 110 to facilitate communication with other components in the system. In some embodiments, message storage unit 150 is topographically near to web server 120 (to facilitate updates to the messages there) and message transmission unit 160 (to facilitate broadcasted messages from there, especially in the event of partial network outage) in the system. In alternative embodiments, message storage unit 150 is a file server connected by LAN to those components.

Message transmission unit 160 includes one or more devices, such as an automatic dialer known in the art, for broadcasting messages to a plurality of contacts. When an administrator commands the system to broadcast a message to a group of recipients as discussed herein, message transmission unit 160 sends the message(s) identified by the administrator to a list of fax numbers, sends a recorded audio message(s) to a list of telephone numbers, sends a text message(s) to a plurality of cellular phones and pagers, and sends a selected e-mail message to a list of e-mail addresses. Message transmission unit 160 preferably comprises telephony boards from Dialogic, an e-mail server, and the like. In other embodiments, a personal computer with a modem, an Internet connection, and appropriate software provides a slower but less expensive implementation. Still other combinations of hardware and software to achieve tasks described herein will occur to those skilled in the art in light of this description.

Interactive voice response (IVR) unit 170 is programmed using tools and techniques that will be understood by those in the art to facilitate the checking, confirming, and updating of information in contact database 140 by the contacts identified therein. IVR unit 170 is also programmed to receive confirmation calls and return messages in connection with the distribution of emergency communications using the present invention, as will be further described below.

Switch 180 provides a connection for message transmission device 160, IVR unit 170, and any other devices in the system (though additional connections are not shown) to the telephone system 190. This connection may be direct between the telephony devices, a PBX system, and the like. In alternative embodiments, the connection for switch 180 to the public switched telephone network (PSTN) is made via a voice-over-IP (VOIP) interface, or through other interface technologies as would occur to one skilled in the art.

Each of web server 120, PC 130, contact database 140, and message storage device 150 preferably includes a hard drive, processor, and memory, as well as a network interface, output device(s), and input device(s), as are known by those skilled in the art. The processor is preferably a microcontroller or general purpose microprocessor that reads its programming instructions from the memory. The processor may be comprised of one or more components configured as a single unit. Alternatively, when of a multi-component form, the processor may have one or more components located remotely relative to the others. One or more components of the processor may be of the electronic variety defining digital circuitry, analog circuitry, or both. In one embodiment, the processor is of a conventional, integrated circuit microprocessor arrangement, such as one or more PENTIUM 4 or XEON processors from INTEL Corporation of 2200 Mission College Boulevard, Santa Clara, Calif., 95052, USA, or ATHLON XP processors from Advanced Micro Devices, One AMD Place, Sunnyvale, Calif., 94088, USA.

The output device(s) provide video display output, and may also provide signals to one or more additional output devices such as LEDs, LCDs, or audio output devices, or a combination of types, though other output devices and techniques could be used as would occur to one skilled in the art. Likewise, the input device(s) may include push-buttons, UARTs, IR and/or RF receivers, decoders, scanners, cameras, or other devices, as well as traditional keyboard and pointing devices, microphones, and handsets. In alternative embodiments, one or more application-specific integrated circuits (ASICs), general-purpose microprocessors, programmable logic arrays, or other devices may be used alone or in combination as would occur to one skilled in the art.

Likewise, the memory can include one or more types of solid-state electronic memory, magnetic memory, or optical memory, just to name a few. By way of non-limiting example, memory can include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); optical disc memory (such as a recordable, rewritable, or read-only DVD or CD-ROM); a magnetically encoded hard disk, floppy disk, tape, or cartridge media; or a combination of any of these memory types. Also, the memory can be volatile, nonvolatile, or a hybrid combination of volatile and nonvolatile varieties.

Contact database 140 is preferably a relational database hosted on a computer that is separate from web server 120. The computer hosting contact database 140, as is known in the art, has a processor, memory encoded with the programming instructions, and non-volatile storage to hold the database. In some embodiments the database is an object-relational database, while in other embodiments it is stored as a flat file, in a spreadsheet, or in another form of storage as would occur to one skilled in the art. In some embodiments contact database 140 is a single, monolithic database, while in others it is distributed across multiple storage devices or computers.

Likewise, message storage unit 150 has various forms in various embodiments, including the simple file-system storage approach, a relational database approach, or other storage strategy as would occur to one skilled in the art. Again, in various embodiments, message storage unit 150 is monolithic, saved in multiple files on a single device, saved across multiple devices, and even saved on different computers and/or networks.

FIGS. 2-7 illustrate one embodiment of a user interface for administration of contact database 140 according to the present invention. Non-administrative users are presented with screen 200 as shown in FIG. 2. Upper portion 210 of screen 200 includes a contact identifier field, name fields, and affiliation information fields. Data section 210 also includes a field for the contact's title, work and mobile telephone numbers, work fax number, and e-mail address. Central area 220 of the present embodiment includes four administrator-defined fields. In this example, the field names are "Contact Type," "Territory," "Custom 4," and "Custom 5." Each field can be filled using a listbox or other GUI widget that is automatically configured with options available for that field from data defined by an administrator.

Notification options area 230 provides a means by which the contact (or administrator) can select one or more preferred channels for emergency communication. In the embodiment shown, each listed communication channel can be selected or deselected, while in other embodiments contacts may choose to prioritize the available communication channels using interface and storage techniques that will occur to those skilled in the art. The contact's channel preference information (including either a "yes/no" preference or preference for one particular channel of communication or over another channel of communication) is preferably stored in contact database 140. Though in alternative embodiments it may be stored in other portions of the system as would occur to one skilled in the art.

Tabbed lower portion 240 of interface screen 200 provides an area in which contacts enter, review, and modify their company address information, personal address information, emergency contact data, and supervisor identification information. After the contact has entered all applicable information, he or she clicks one of the Confirm/Save buttons 250, 255, and the information is saved in contact database 140.

Figure 3:
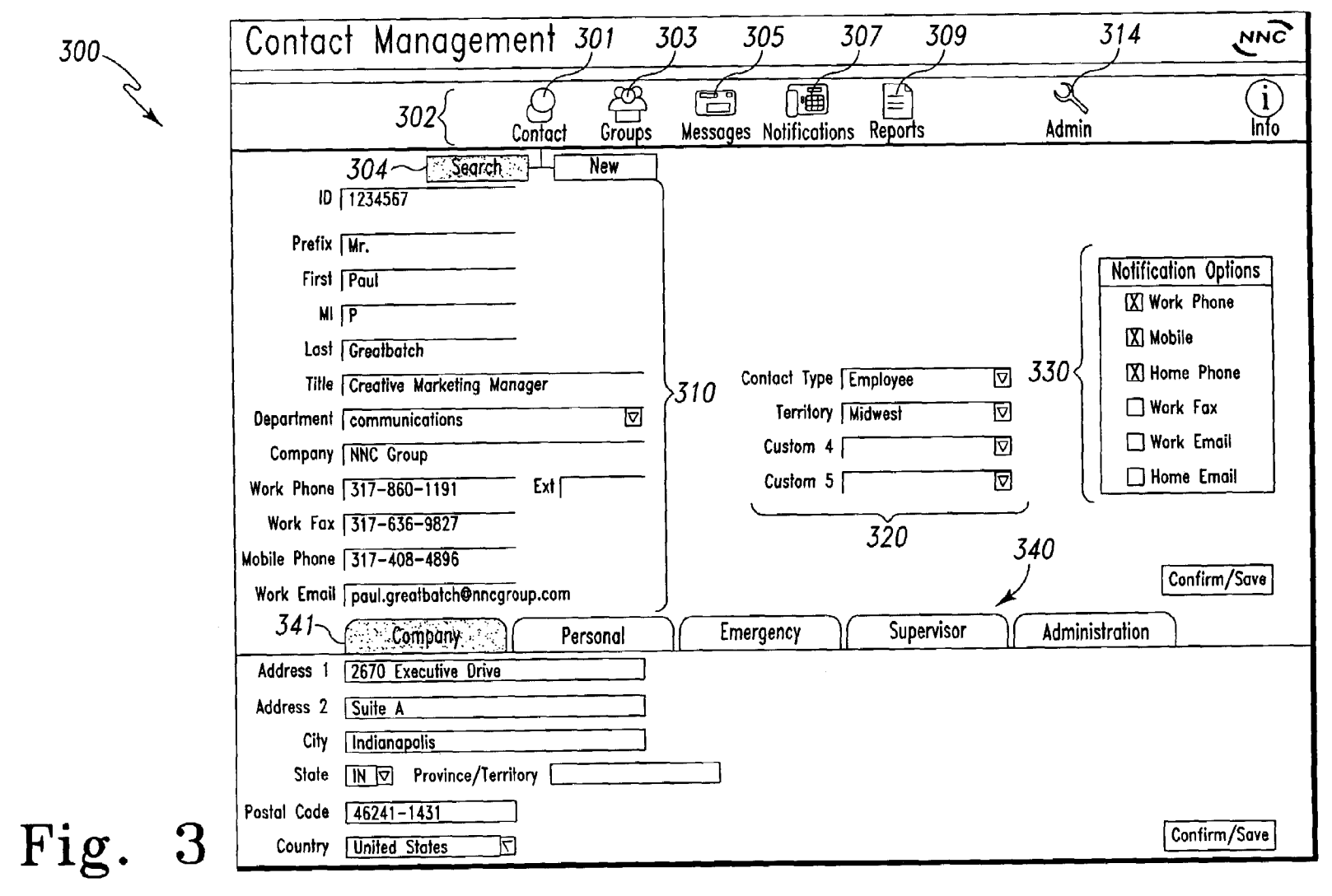
Figure 4:
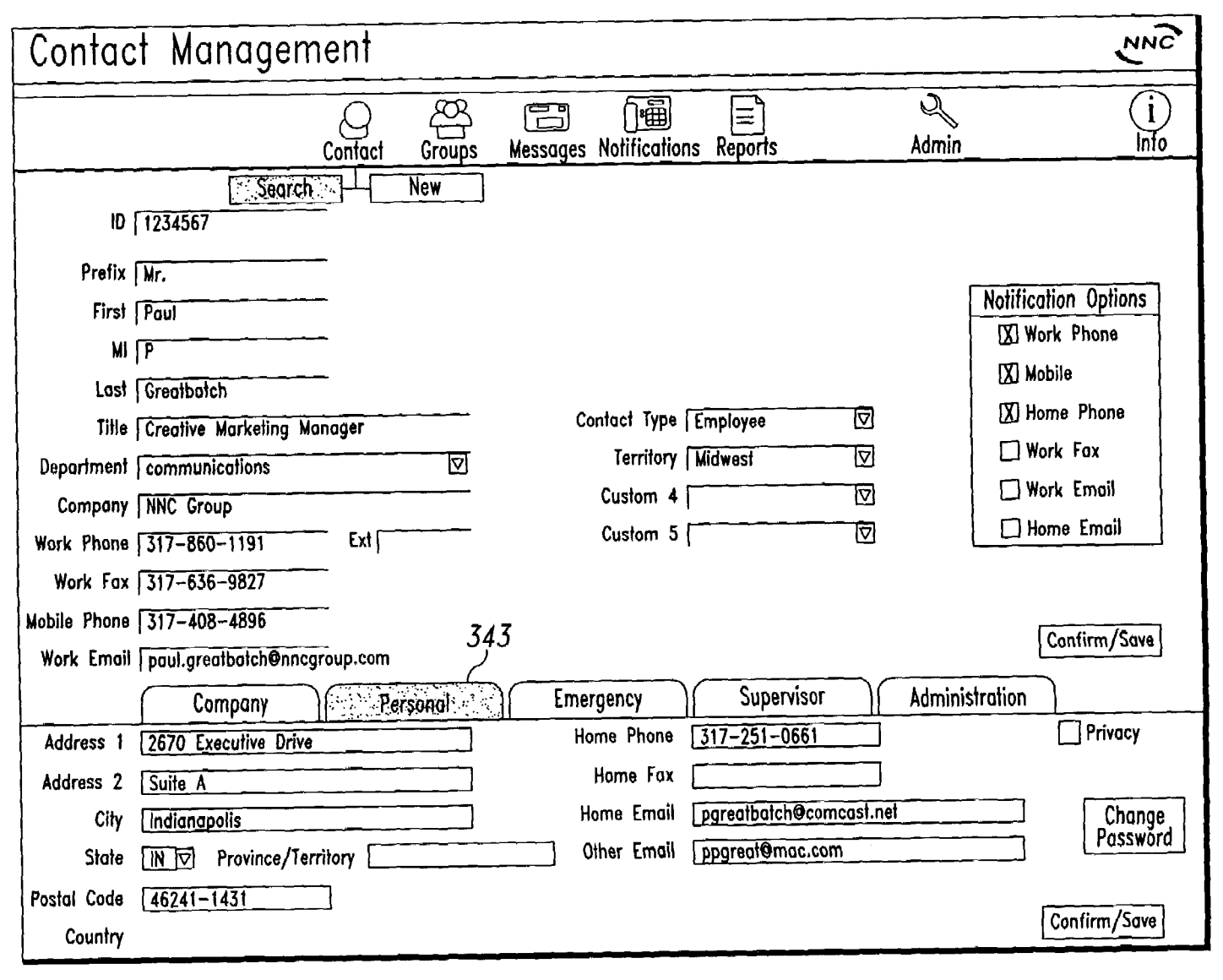

Turning now to FIG. 3, after authentication using any of the variety of means known to those skilled in the art, an administrator in the present embodiment is presented with user interface screen 300, as shown in FIG. 3. A variety of tasks are available to the administrator, and are organized in navigation bar 302. Single-contact tasks are available under Contact icon 304, group definition and modification tasks are under Groups icon 306, message recording and organization tasks are under Messages icon 308, matching of messages with recipients and delivery configuration options are defined and modified under Notifications icon 310, and reporting functions are available under Reports icon 312. FIG. 3 in particular illustrates interface screen 300, which includes components similar to those shown in interface screen 200, but adapted for finding and modifying existing records. The Search function is selected via button 304, and one or more data fields are filled by the user to provide search criteria. Once the desired record is found, fields in data section 310 may be modified with updated name, identifier, employment/affiliation, telephone, and e-mail information, and custom fields may be updated in central area 320. The notification option controls in area 330 may also be modified by the administrator (and re-prioritized in embodiments where prioritization is also stored), and additional data fields can be checked and modified in lower data entry area 340. Lower data entry area 340 includes tabs for the contact's company address (341), home address, phone number, and e-mail address(es) (343, see FIG. 4), and supervisors' name, department, and work phone numbers (under tab 347, shown in FIG. 6).

Figure 7:
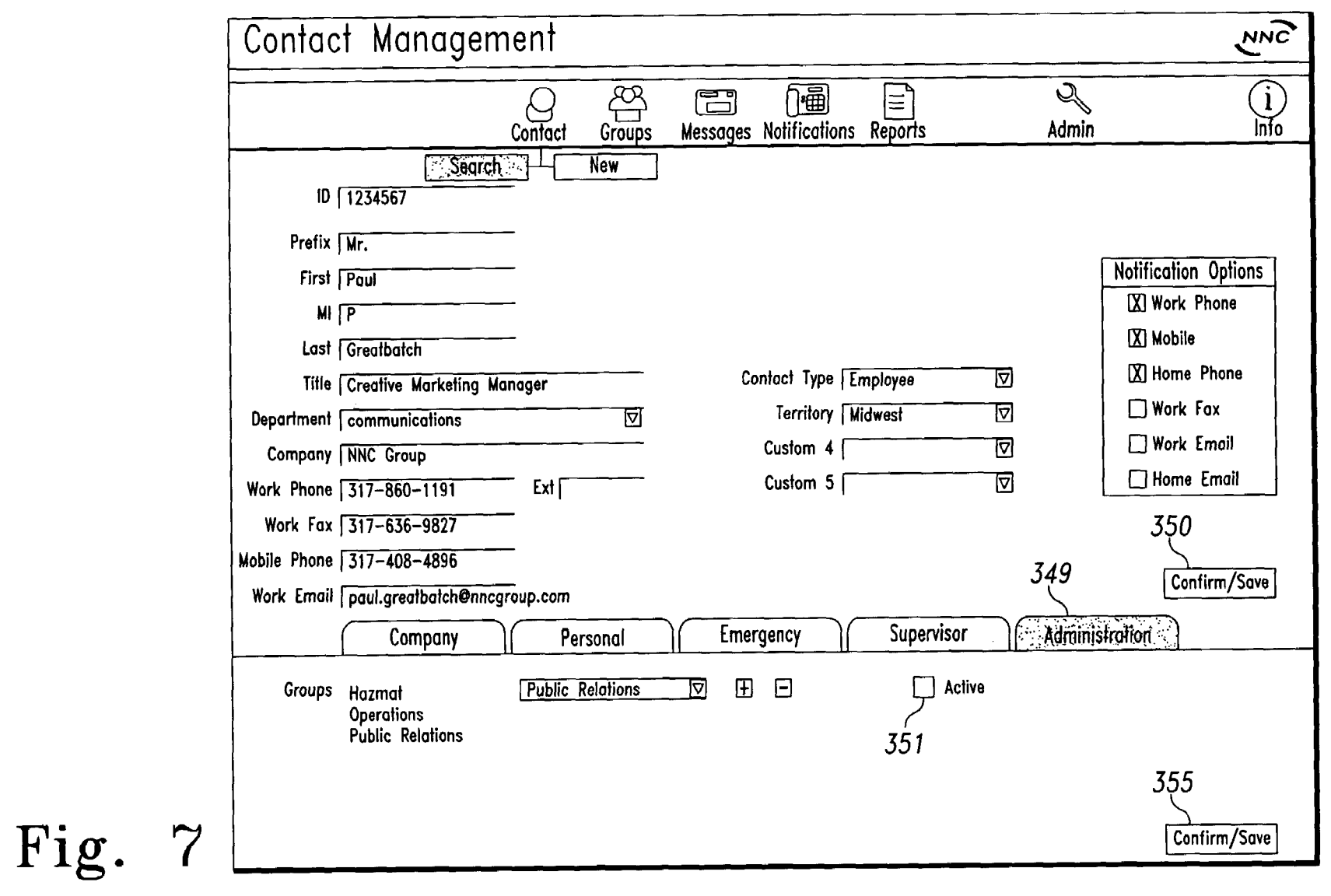

Administrators also can assign and modify additional information for contacts under Administration tab 349, shown in FIG. 7. Under Administration tab 349 in the exemplary embodiment, an administrator can assign and remove group affiliations for each contact in contact database 140. An administrator can also note that the contact is no longer active in the organization by unchecking Active checkbox 351. When the information on these various input pages has been confirmed and/or modified as desired, the administrator clicks one of the Confirm/Save buttons 350, 355, and the updated information is saved in contact database 140. Contact database 140 also notes the confirmation/save event in the database in relation to the user for reference during follow-up currency checks as discussed in relation to FIG. 25 below.

Figure 8:
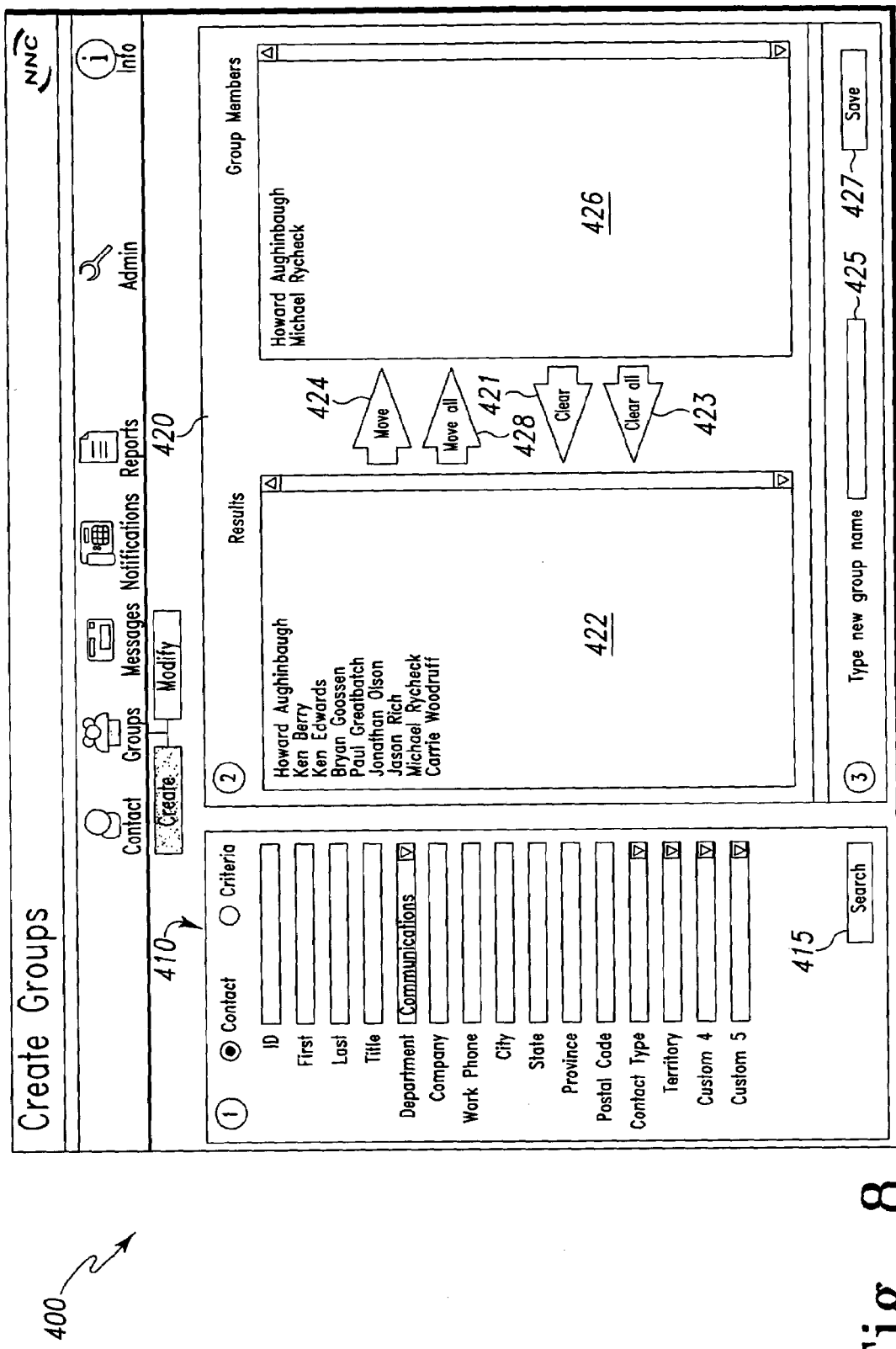

Techniques according to the present invention for creating and modifying contact groups are now discussed with reference to FIG. 8 and continuing reference to certain elements of FIG. 1. In the left-hand portion of the user interface screen 400, an administrator can select either a "contact group" or a "criteria group," the former being illustrated in FIG. 8, and the latter being shown in FIG. 9. In a "contact group," the administrator puts limiting search criteria in the corresponding data fields of pane 410, then clicks the search button 415 (or presses enter). The system finds the contacts in contact database 140 that match the criteria and places their names in results area 422 of contact selection pane 420. The desired contacts can be added to the group that is being created by selecting their names in results area 422, then selecting the Move widget 424, which adds the selected contacts to the Group Members area 426 and changes the presentation of those contacts' names in Results area 422. Alternatively, the administrator can add all of the contacts from the Results area 422 to the group by selecting Move All widget 428. Single contacts or the entire current collection can be removed from Group Members area 426 by a click of Clear widget 421 or Clear All widget 423, respectively.

When the desired contacts have been selected, the administrator can enter a name for the group of contacts in field 425, then save the collection under that name by clicking Save button 427.

Figure 9:
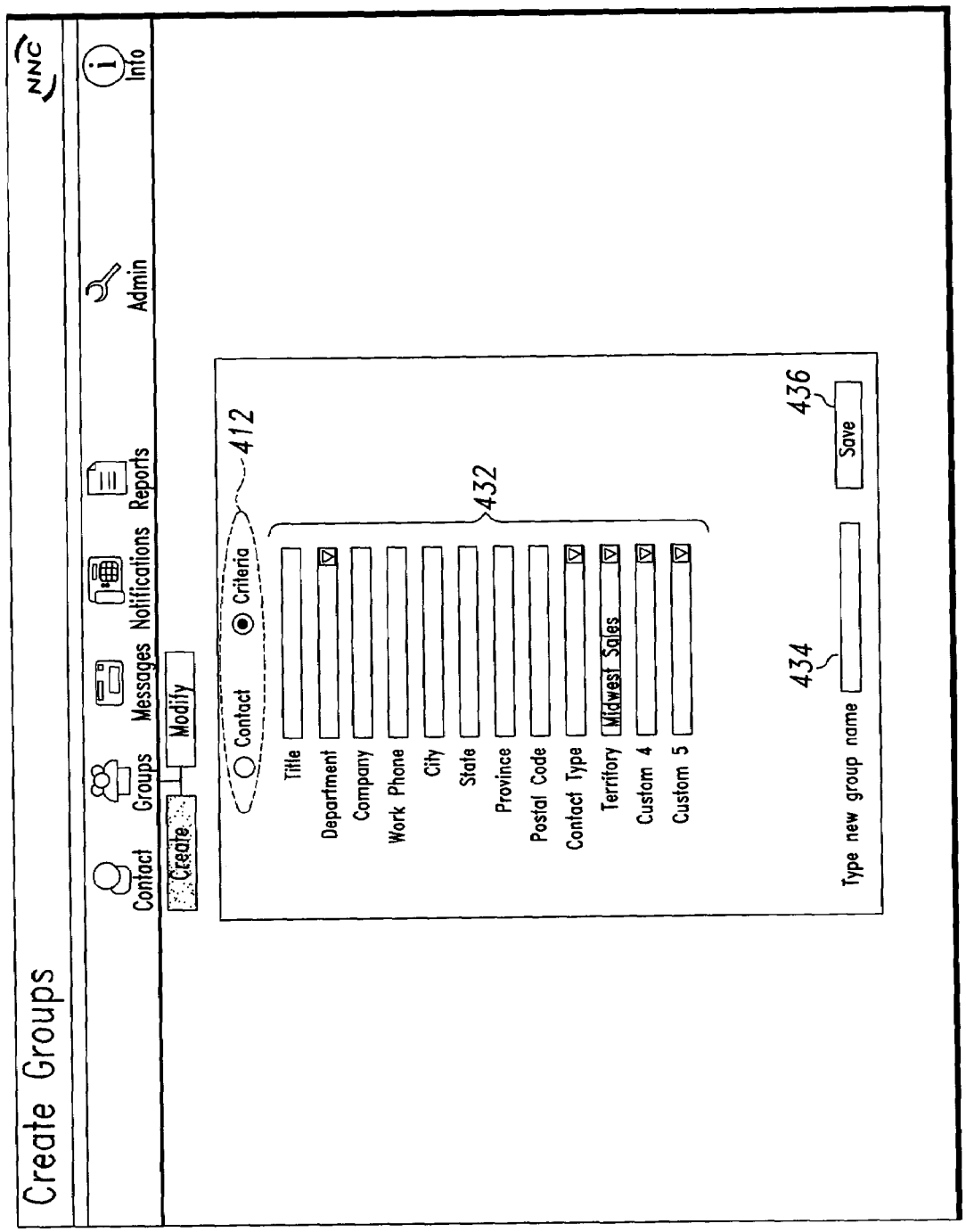

FIG. 9 illustrates a way to create a criteria group in the illustrated embodiment. After selecting the Criteria radio button from radio buttons 412, the administrator identifies one or more search criteria by entering desired values in the respective fields that are available in panel 432 of screen 430. In preferred embodiments, at least one criterion is a function (equivalence or comparison, for example) of the value in one of the user-defined data fields. When the criteria have been entered and a name for the set of criteria has been entered in field 434, the administrator clicks Save button 436, and the criteria set is saved under the name given in field 434.

Figure 10:
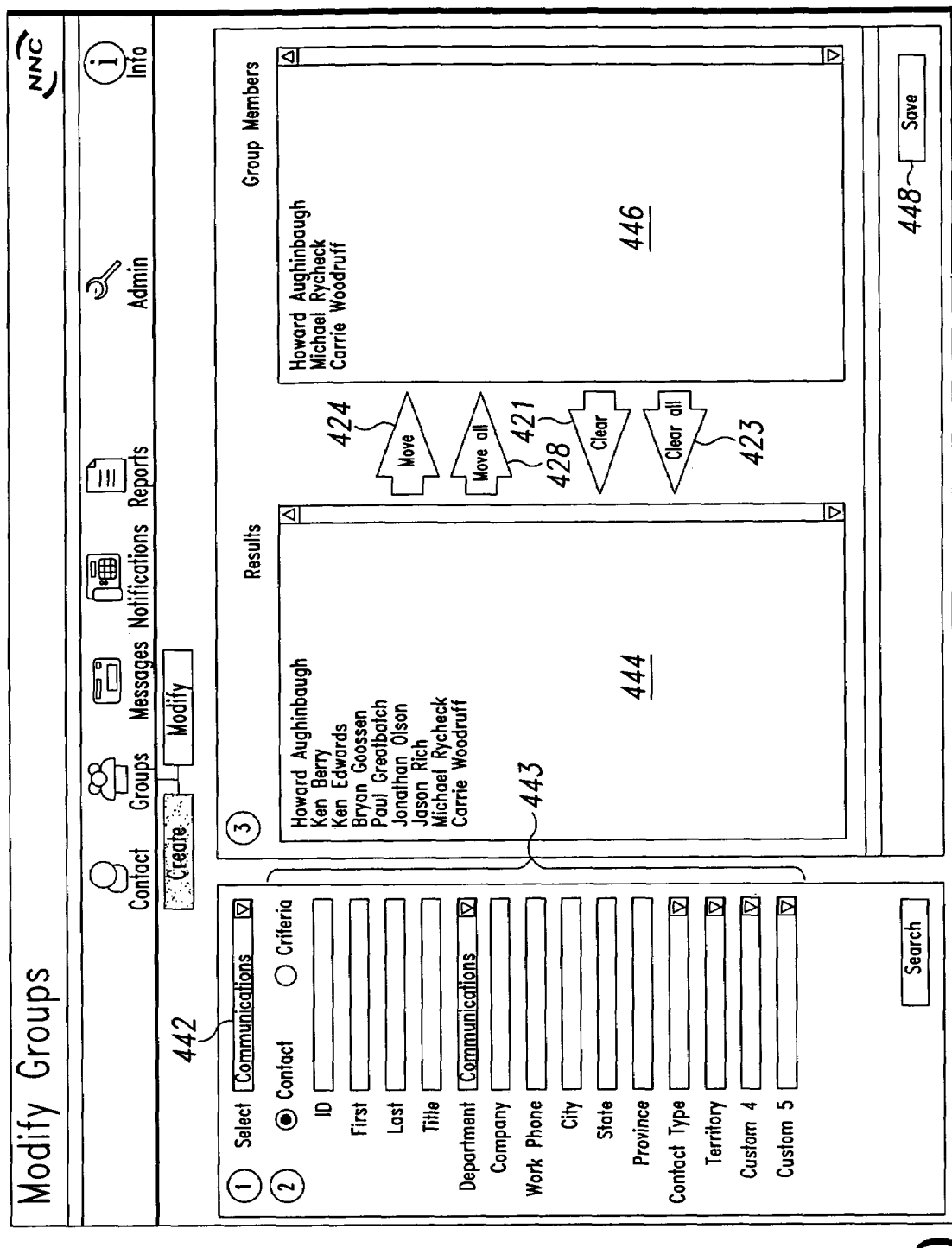

FIG. 10 illustrates user interface screen 440, With which administrators can modify Contact Groups that have been defined as described above. The administrator first selects a group to modify using listbox 442, and the system fills in the criteria in criteria region 443, adds corresponding contacts to Results area 444, and adds the previously selected group members to Group Members area 446. The remainder of the controls user interface screen 440 operate as described above in relation to FIG. 8. When the revisions to the selected group are complete, the administrator selects Save button 448, and the updated contact group is saved in contact database 140. Criteria groups may be modified in an analogous fashion-using an interface screen like that shown in FIG. 9, but adapted for modification of criteria instead of simple entry.

Figure 11:
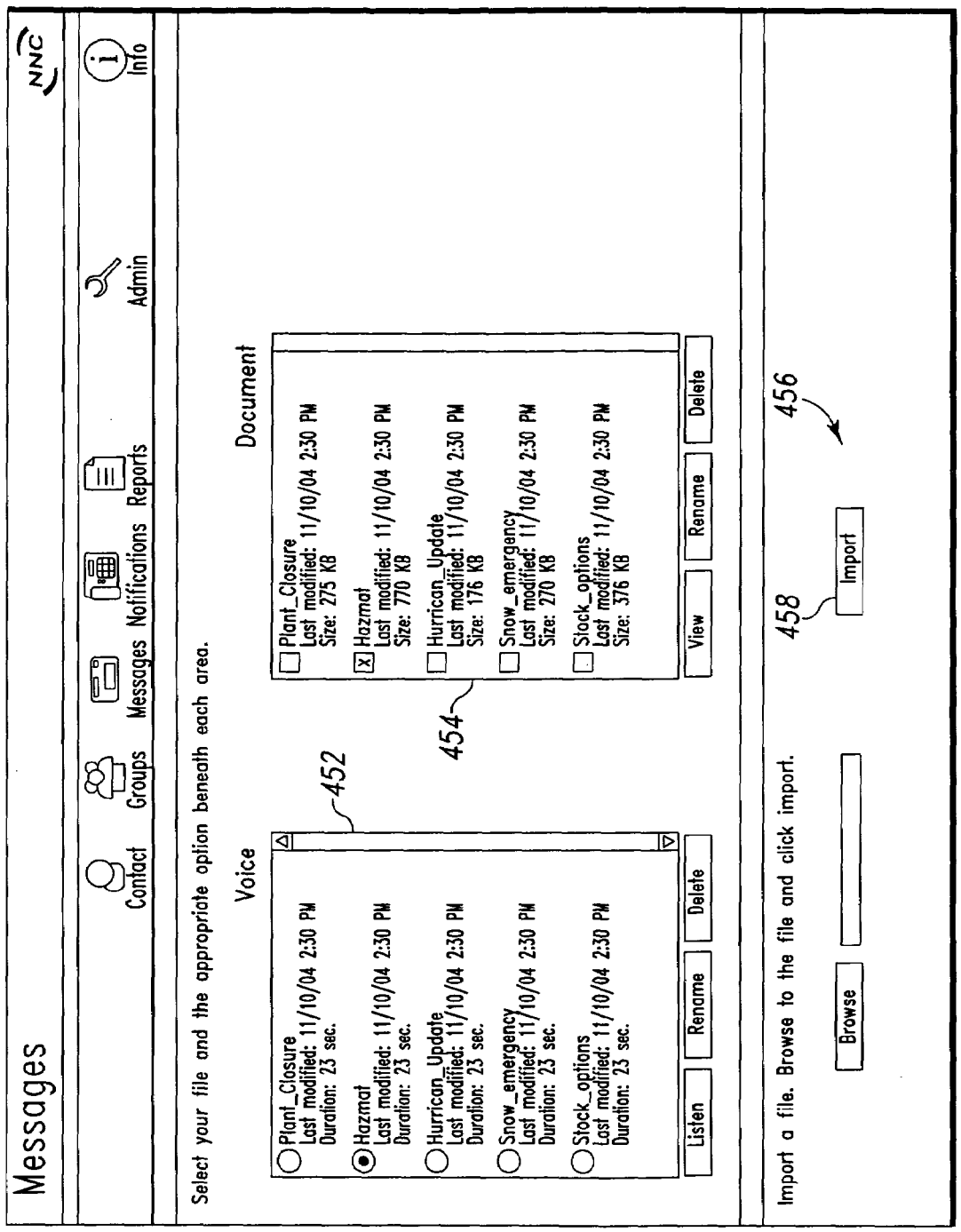

Management of messages for broadcast in crisis situations according to one illustrated embodiment will be discussed with reference to user interface screen 450 in FIG. 11. In the left portion 452 of screen 450 is a list of voice messages that have been stored in message storage database 150. Right portion 454 lists text and other viewable messages ("documents") that have been stored. In the illustrated embodiment, new voice and text messages may be added to message storage 150 using lower portion 456 of interface screen 450. There the user can browse accessible storage to find and retrieve sound (for voice-type channel messages) and document (for non-audio channels) files. The administrator then clicks the Import button 458, and the selected file is transferred to message storage device 150, possibly via web server 120. The file then appears in voice message list 452 or document list 454 so that it is available for additional actions by the administrator.

Those actions for uploaded files include listening (for voice messages), viewing (for document files), renaming and deleting, to name a few examples. In some embodiments, one message is acted on at a time, while in other embodiments multiple messages or documents may be handled at once. Other actions for maintenance of these files will occur to those skilled in the art.

When the administrator selects the Notifications icon 310 in navigation area 302, he or she is presented with screen 460 (see FIG. 13), wherein one creates an actual distribution list of contacts to which communications will be distributed. In area 462, the administrator selects one or more groups (defined and managed as described above) to whom messages will be sent. If a group selected in area 462 is a contact group, then the list of contacts stored in that group under the name given by the administrator is loaded. If a selected group is a "criteria group," then specifying the criteria set name causes the associated criteria to be retrieved using the name given by the administrator when the group was stored. This retrieval as part of setting up a notification task may occur immediately after the groups are defined, or may occur on a different day or otherwise later than the storage of the group definition (as a list of contacts or criteria). The administrator can use interface area 464 to identify and add additional contacts to whom the messages should be sent. Search fields, results area, and "Recipients to Add" area operate like the analogous interface areas in FIG. 8. In some embodiments, all contacts from all select groups are sent messages automatically, while in others only those marked "Active" in contact database 140 (see FIG. 7 and accompanying text) are sent messages. When all desired groups are selected and additional contacts are added (if any), the administrator clicks the Continue button 466, and the system moves on to the notification preferences page shown in FIG. 13.

FIG. 13 illustrates interface page 470, which includes interface areas 471, 473, and 475, plus Back button 477 and Continue button 479, which have functions well understood by those skilled in the art. In interface portion 471 the administrator indicates the communication channels that will be used for broadcast of selected messages. In this embodiment, the administrator may allow user preferences to be respected so that when a user has requested to be notified only via certain channels (as illustrated in interface portion 230, as shown in FIG. 2), or has prioritized channels in an order of preference (not shown in the figures, but discussed above), then system 100 attempts first to reach that contact via the preferred channel(s) whenever possible. For example, when a notification task includes only text or other visual content, users' preferences for voice communication channels might be ignored. Alternatively, the administrator may choose to override user preferences, providing in their place a prioritized list of channels to be used to reach all contacts. Another option presented to administrators is to send the selected messages via all available channels for each contact.

eti enables the administrator to express certain configuration options for the notification task. In this embodiment, one option is to allow a reply (here limited to 60 seconds, though that limitation is different or absent in other embodiments) by each contact who is reached through a channel that includes a return voice path. Another option is to have the system request and register confirmation of receipt of the message(s) by each contact. A third available option is to automatically attempt to resend messages that are not received (or are not acknowledged) within a reasonable period of time. Communication failures are detected during the sending process and may also indicate that a particular message should be resent. In this embodiment, the "retry interval" between attempts is configurable among a predetermined set of choices. A fourth available configuration parameter is the number of attempts allowed for re-sent messages.

When an administrator requires or allows a reply, each contact (or each contact whom the system attempts to reach via one or more particular communication channels) must (or can) provide that response via a suitable return channel. For example, when a reply is given to a message that was transmitted by telephone, the system prompts the contact to record that response. In some embodiments, the system plays a recorded audio message, prompts the contact with a standard response prompt, then records the contact's reply. In some embodiments, the length of the reply is limited by the system to a standard length of time, while in others the maximum is configurable by the administrator on notifications configuration screen 470 (see FIG. 13). In others, the contact must take an affirmative action (pressing a specified button on the telephone, for example) to continue recording past a predetermined time. In each of these embodiments, the reply message is stored in a predetermined location based either on a changeable or unchangeable system configuration parameter, administrator configuration option for a notification task, or other means known to those skilled in the art. These configurations may include saving voice replies in electronic storage associated with web server 120, contact database 140, message storage 150, message transmission device 160, IVR unit 170, or other available storage as would occur to one skilled in the art.

Replies to messages transmitted by facsimile may be sent as return facsimile transmissions, wherein the reply is linked for purposes of the system using the station ID on the return transmission by optical character recognition of the contact's name or other identifier on the return fax, or by other means that will occur to those skilled in the art. Alternatively, replies to facsimile transmissions may be made by telephone via IVR unit 170. Here, the IVR dialog includes the contact entering a contact identifier and the system recording the reply message using prompting and answering techniques and storage technology that will be understood by one skilled in the art.

Message transmissions by pager can also use this IVR reply interface. Likewise, e-mail messages may solicit replies by e-mail, by an IVR technique, or using other methods known in the art.

Lower interface portion 475 of screen 470 provides a field in which the administrator enters a name for the event or notification being configured. The administrator is also prompted to indicate whether to begin the broadcast of the selected messages immediately, or to schedule it for a particular day or time. The current time is preferably shown in lower portion 475 so that the administrator can easily determine how far into the future he or she is setting the broadcast to begin.

Figure 14:
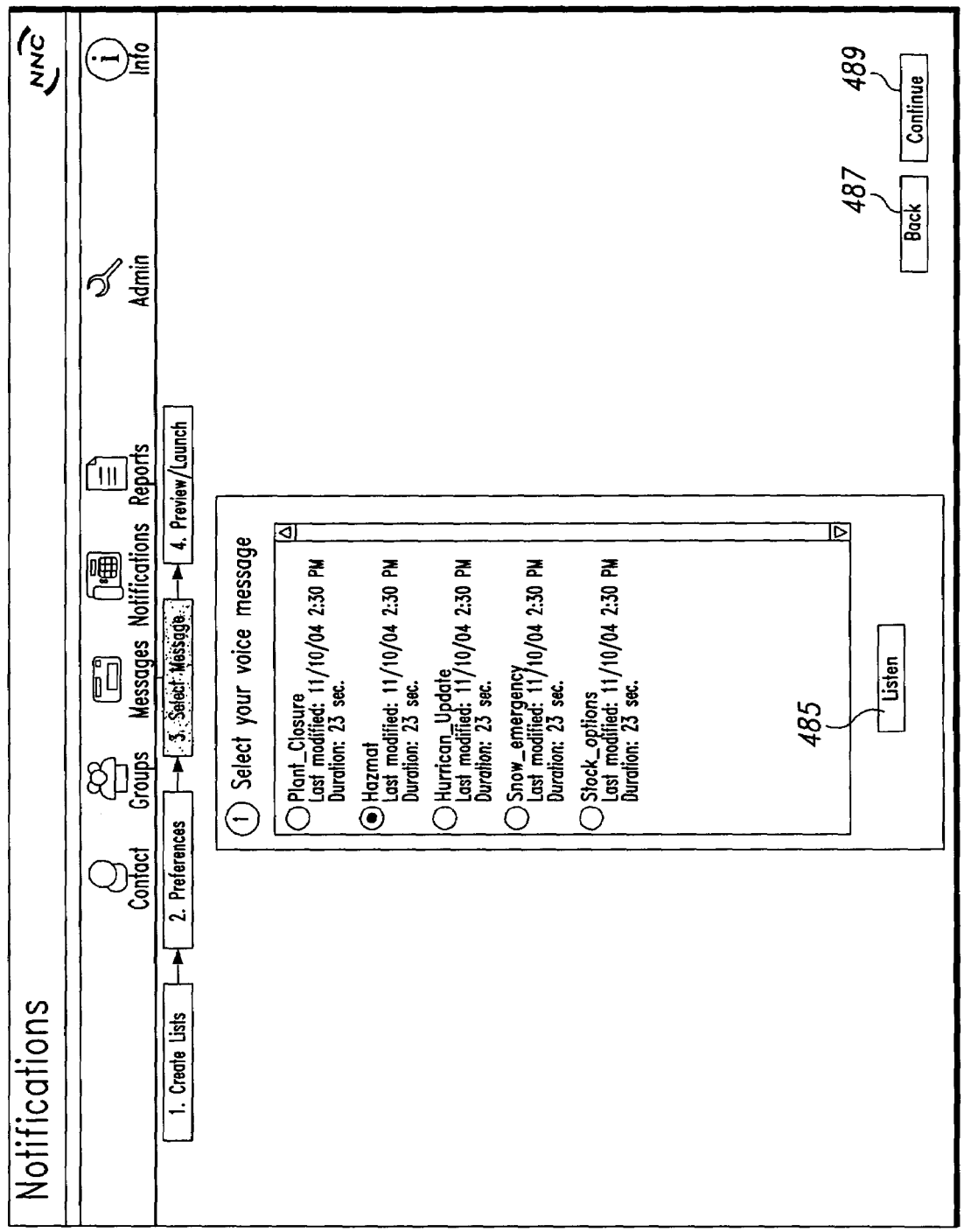

FIG. 14 illustrates interface screen 480, in which the message to be provided via voice channels is selected. In one embodiment, the selection is made via exclusive radio button so that only one voice message may be selected. In other embodiments, multiple voice messages may be selected and arranged in the order in which they should be played. The administrator can listen to a selected message by clicking Listen button 485 before proceeding with a particular selection. Back button 487 and Continue button 489 each have functions well understood in the art.

Figure 15:
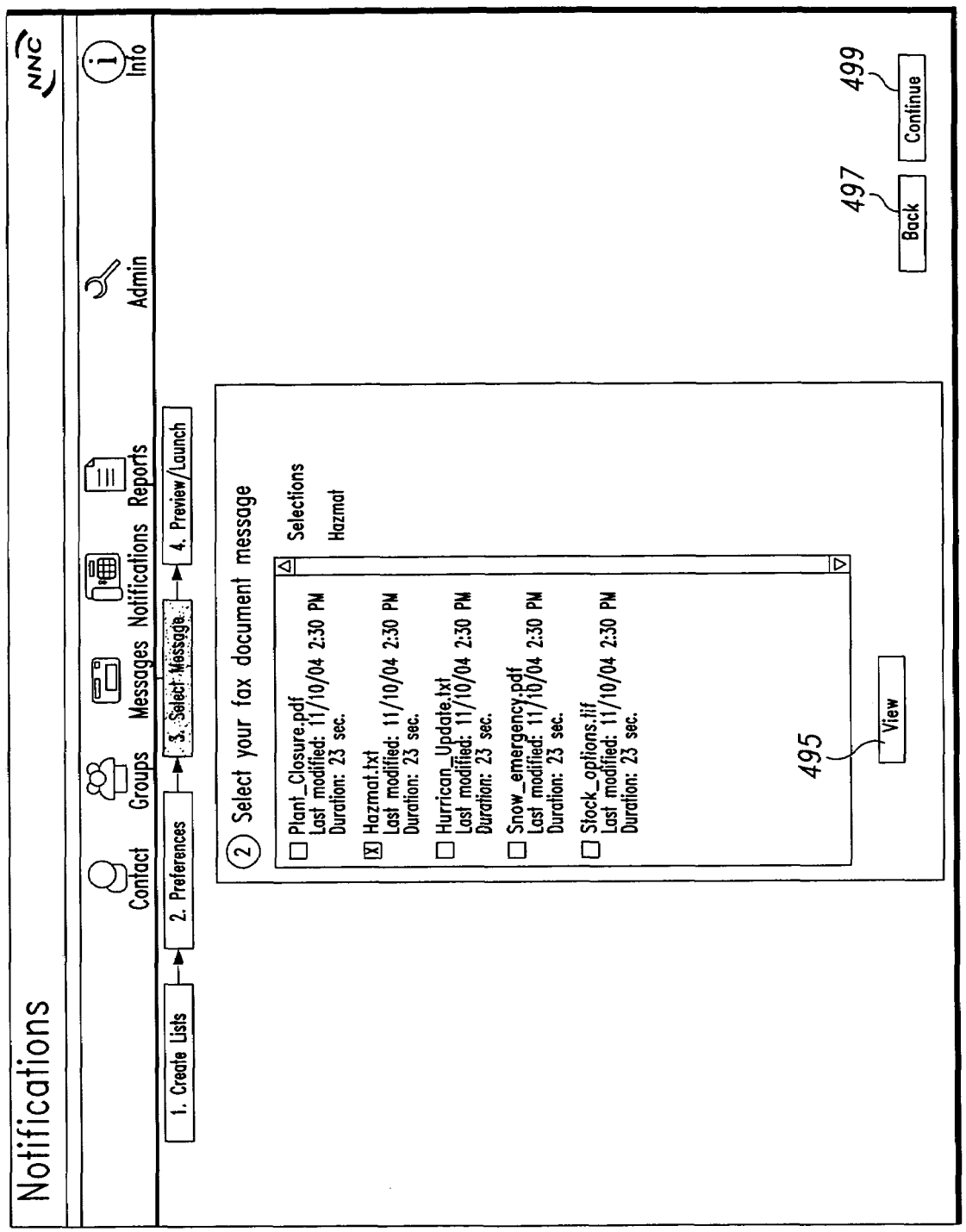

FIG. 15 illustrates interface page 490, in which the administrator selects one or more documents to be transmitted whenever a facsimile channel is selected (as a preferred channel of a contact, or by the administrator in an override of preferences, or where a facsimile channel is the only appropriate channel for contacting a particular contact). The selected document(s) can be previewed by selecting them and clicking the View button 495. The administrator can return to previous interface screens by clicking Back button 497, or can continue to prepare the notification set by clicking the Continue button 499.

Figure 16:
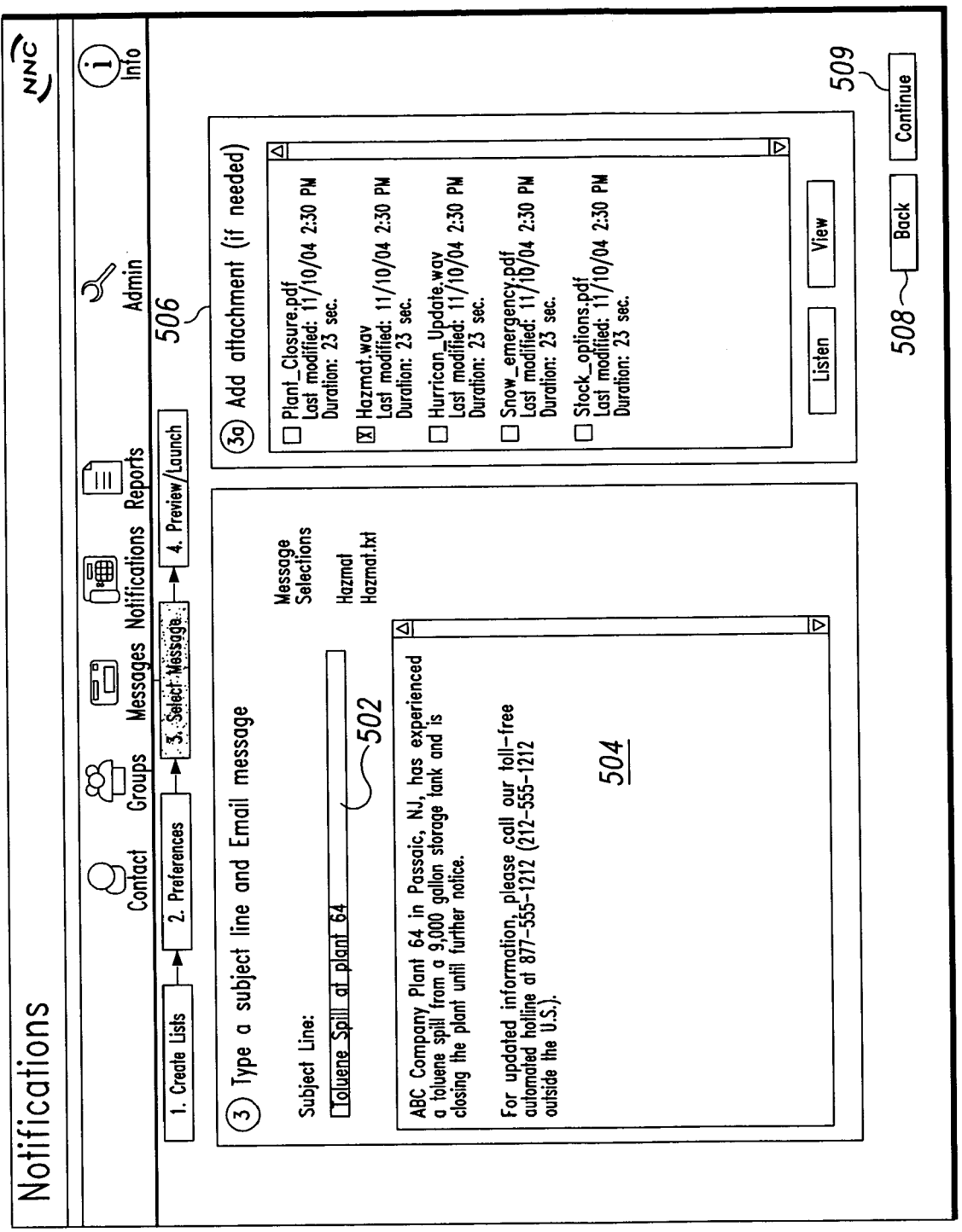

The form and content of e-mail messages to be sent in the broadcast are selected by the administrator in interface page 500, as shown in FIG. 16. The administrator enters the subject line for the e-mail transmission in text box 502 and the body of the message in text area 504. Attachments may be added using interface area 506, and those attachments may include electronic documents in any of a variety of formats. For example, sound files in a WAV format, other printable documents (in PDF format, for example), text files and the like may each be selected from among previously uploaded files, or in some embodiments may be uploaded via the interface (not shown) at this stage of preparation. As above, the administrator can click the Back button 508 to return to previous interface screens, or may click Continue button 509 to proceed with the configuration.

Figure 17:
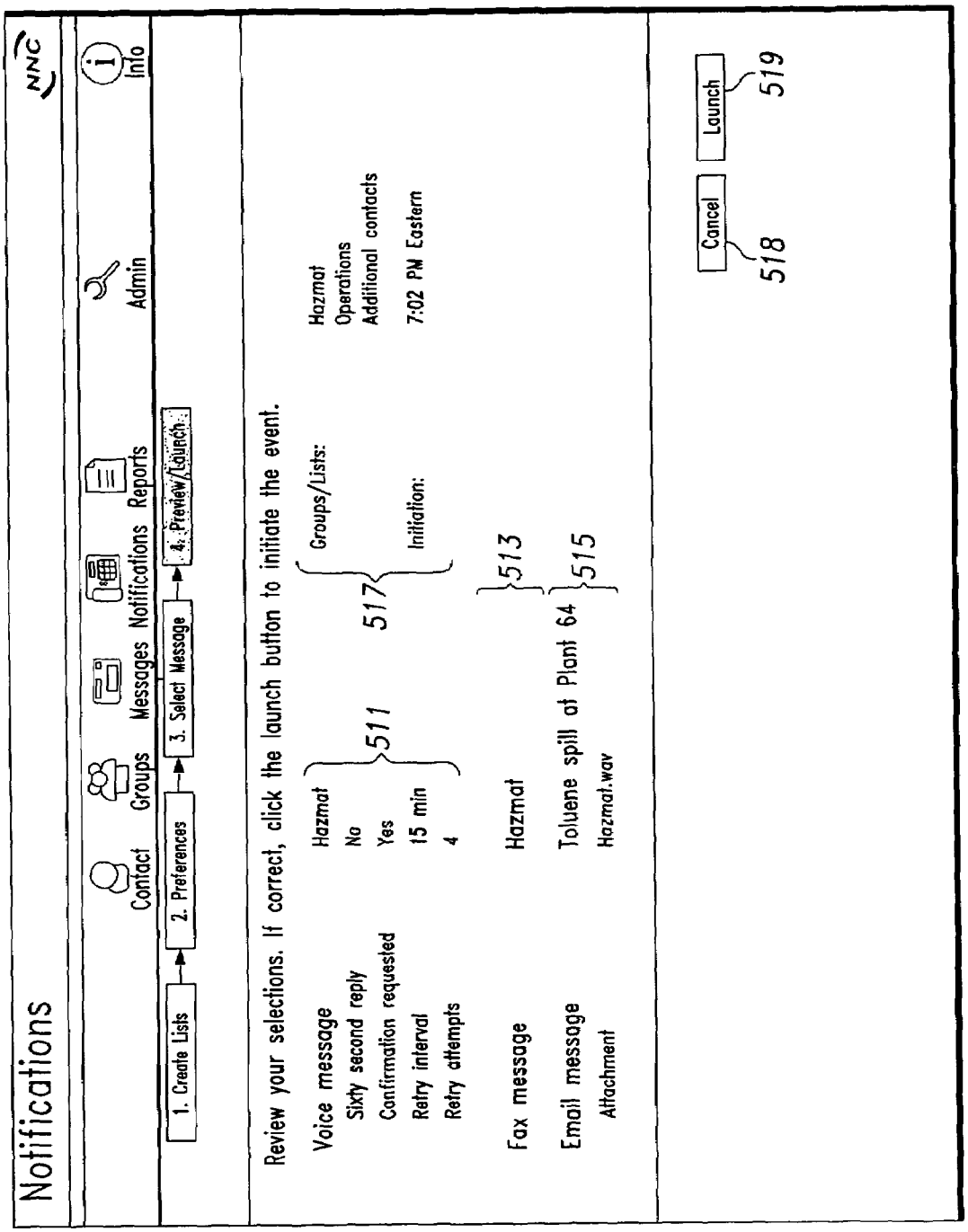

After completing interface screen 500, the administrator is presented with a summary of his or her configuration choices in interface page 510, as shown in FIG. 17. Interface portion 511 confirms the voice message selection and configuration options, portion 513 confirms the fax message configuration, interface portion 515 confirms the e-mail message configuration choices, and portion 517 confirms the group selection and initiation time. At this point, the notification may be cancelled by the administrator by clicking Cancel button 518, or may be executed by the administrator clicking the Launch button 519. When launched, the notification event either begins to immediately transmit the selected messages through the selected channels, or merely prepares for that broadcast to occur at the selected future point in time (for example, by saving the contact information, configuration options, and selected messages for easy retrieval when the broadcast begins).

While a notification task is in progress, or after it is complete, administrators can view reports of certain related actions. One set of reports is accessed through user interface page 520 as illustrated in FIG. 18. The administrator navigates to this page by clicking Reports icon 312 in navigation area 302 (see FIG. 3). The default view after that selection is a list of outbound notification tasks and their initiation time, completion status, total and/or attempted message count, and several action options relating to return messages from contacts reached by the broadcast message. Each task name is preferably presented by the interface as a hyperlink through which a data page of additional information about the task may be obtained. For example, FIG. 19 illustrates data that is preferably reported on such a data page. This report screen 525 includes an exemplary set of data relating to the notification task. In this example, the number of successful, partially successful, and unsuccessful attempts to reach contacts via each possible channel (work, mobile, and home telephones, work fax, work and home e-mail) are included in a completion summary 527, as well as the total successful, partially successful, and unsuccessful messaging attempts. The total numbers of attempts for telephone, fax, and e-mail transmission channels are broken down into various result scenarios as well. For example, messages being sent by telephone might be fully delivered to a person or to an answering machine, be partially delivered to a person or machine, may reach a "busy" or "network busy" signal, may reflect an incorrect or unroutable telephone number, or may reach a modem or receiving fax. Analogous breakdowns are provided for fax and e-mail transmissions as shown in FIG. 19 and as would otherwise occur to those skilled in the art.

A link is preferably provided in interface report page 525 to a detailed report 530 of outbound messages as shown, for example, in FIG. 20. In page 530, completion summary 532 reflects similar information to completion summary 527 in FIG. 19. In addition, to the summary 532, however, table 534 presents information about each messaging attempt to each contact that the system is attempting to reach or has reached. Table 534 includes a Name column 531, a Renotify column 533, and a column for each communication channel used by the system (collectively columns 535). Table 534 also includes filter listboxes 537 or other GUI widget, each populated with the available values for its corresponding column, plus a blank (or "wildcard") entry that matches any value. These filters may be used alone or in combination to filter the contact list so that a specific set of contacts can be re-notified. For example, an administrator might clear all Renotify flags using the "Clear" link in the heading of column 533, then filter for unsuccessful work, mobile, and home phone communication attempts in a notification event where voice contact is crucial. Having selected "failure" in each of the telephone channel columns, the administrator is shown a list limited to those contacts for whom no voice contact has been achieved. The administrator can then select the Renotify checkbox for each contact who is shown in the filtered list (or the "All" link in the heading of column 533), and the system attempts again to notify those contacts. The system in some embodiments immediately adds contacts to the outgoing message queue when their Renotify checkboxes are checked, and removes them when the Renotify box is unchecked. In others, an additional GUI widget is shown on screen 530 before the marked contacts are added to the messaging queue. This interactive filtering based on user-selected functions of completion status of attempts in pending, partially complete, and complete notification tasks, in many embodiments, provides great flexibility and control for the administrator.

In some embodiments, interface screen 520 is generated on the administrator's computer by client software that accesses the status of each communication attempt via network 110 from message transmission unit 160. In others, interface screen 520 is generated by a web browser that accesses web server 120 to retrieve HTML generated by web server 120 based on status data that it, in turn, retrieves from message transmission unit 160. In still others, table 534 in interface screen 530 is produced by a script on the administrator's computer, where the script periodically obtains the current transmission status of the messages being sent from message transmission unit 160. Yet other architectures will occur to those skilled in the art.

FIG. 21 illustrates user interface screen 540 of the present embodiment, which screen is another status report of ongoing, queued, and completed attempts. Summary table 542 again indicates the overall count of messages in each channel that have successfully reached their destinations (or have not), and table 544 provides detailed backup information for that summary. Like table 534 (in FIG. 20), table 544 includes a name column 541 to identify each contact row, Renotify flag column 543, and communication channel columns 545. The displayed table 544, however, displays more detail about each communication attempt than just whether it has been completed or not, or is partially complete. Instead, columns 545 of table 544 display the specific failure code for each failed attempt. Filter selectors 547 provide corresponding selections for filtering the list so that the administrator has more fine-grained control over which contacts to renotify.

Figure 22:
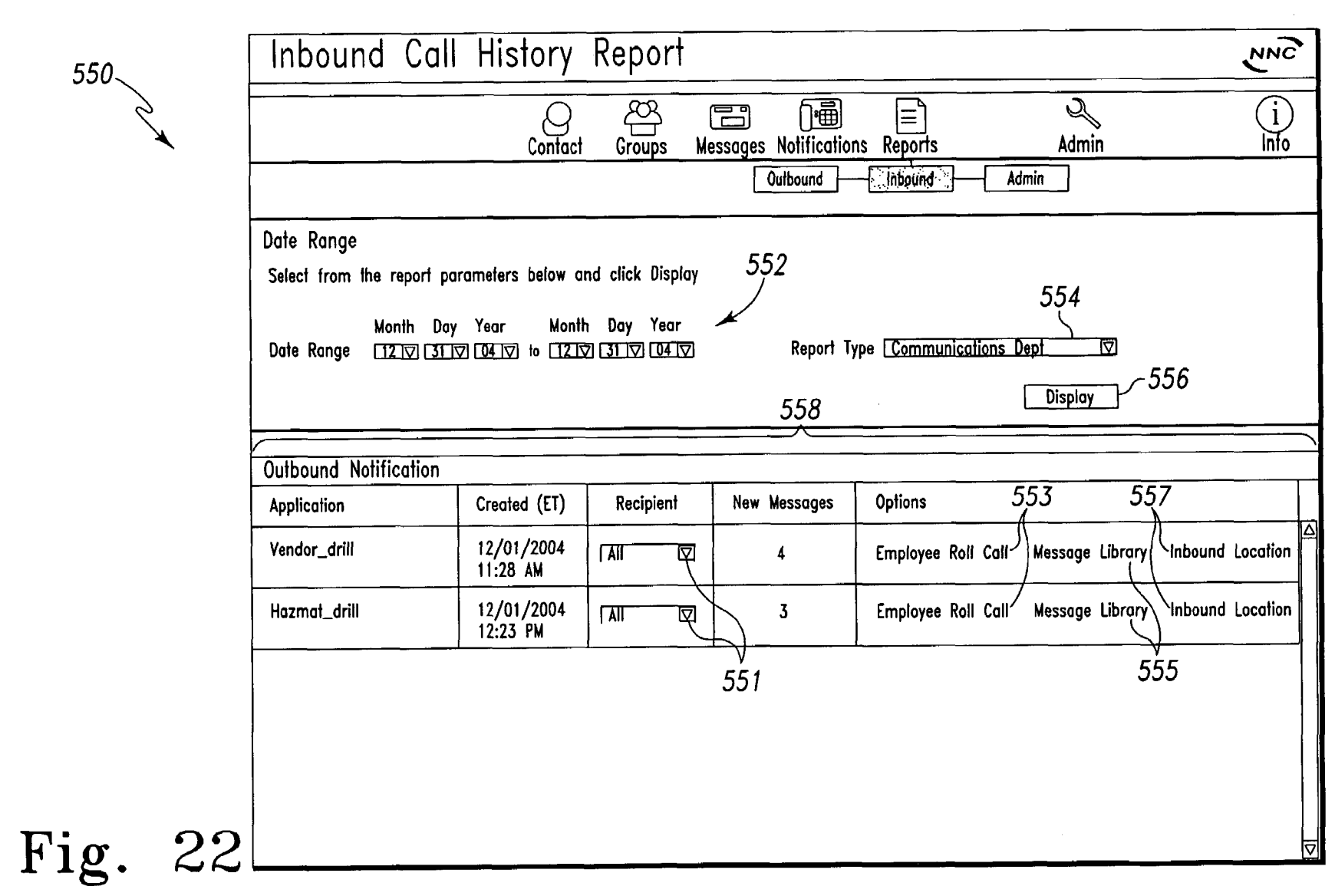

Replies to the broadcast messages may be accessed by the administrator using interface screen 550 of FIG. 22. Available replies can be filtered by date range using the interface widgets in interface area 552 and/or by report type using listbox 554. When configuration options have been selected, the administrator clicks Display button 556 and the system fills interface area 558 with information regarding the replies that meet those selected criteria. Each notification task appears on a line in the present embodiment, and the administrator may act with regard to each using that table row of interface area 558. The contact(s) of interest to the administrator for each notification task can be selected using the listbox 551 for the notification task in question, then one of the command links 553, 555, 557 can be selected.

If the Employee Roll Call command link 553 is selected, the system provides the administrator with a display of a table that lists each contact who had been selected to receive a communication as part of the notification identified on that row of table 558. The responsive report also displays an indication of whether each contact has acknowledged receipt of a message sent in connection with that notification, and those indications are updated in real time. In some embodiments, the table can be filtered as discussed above in relation to table 544 in FIG. 21 to select one or more of the contacts listed therein for additional communication attempts.

If the Message Library action is activated by selecting command link 555 for a particular notification task, the system provides a list of replies which have been received in connection with that notification task using retrieval and display techniques that would occur to one skilled in the art. The administrator can sort, filter, view or listen to, and delete these replies as desired.

Another available action for the notification tasks listed in lower interface area 558 is the Inbound Location action which is available via command link 557. When this action is selected, one or more techniques are applied to reveal the location of a contact when a return message or acknowledgement is provided. In some embodiments, this includes reverse lookup of the phone number (acquired, for example, using ANI technology known in the art) from which the contact provided the return communication, while in others GPS technology is used to determine the precise location of the contact when the return call is made or message sent.

Figure 23:
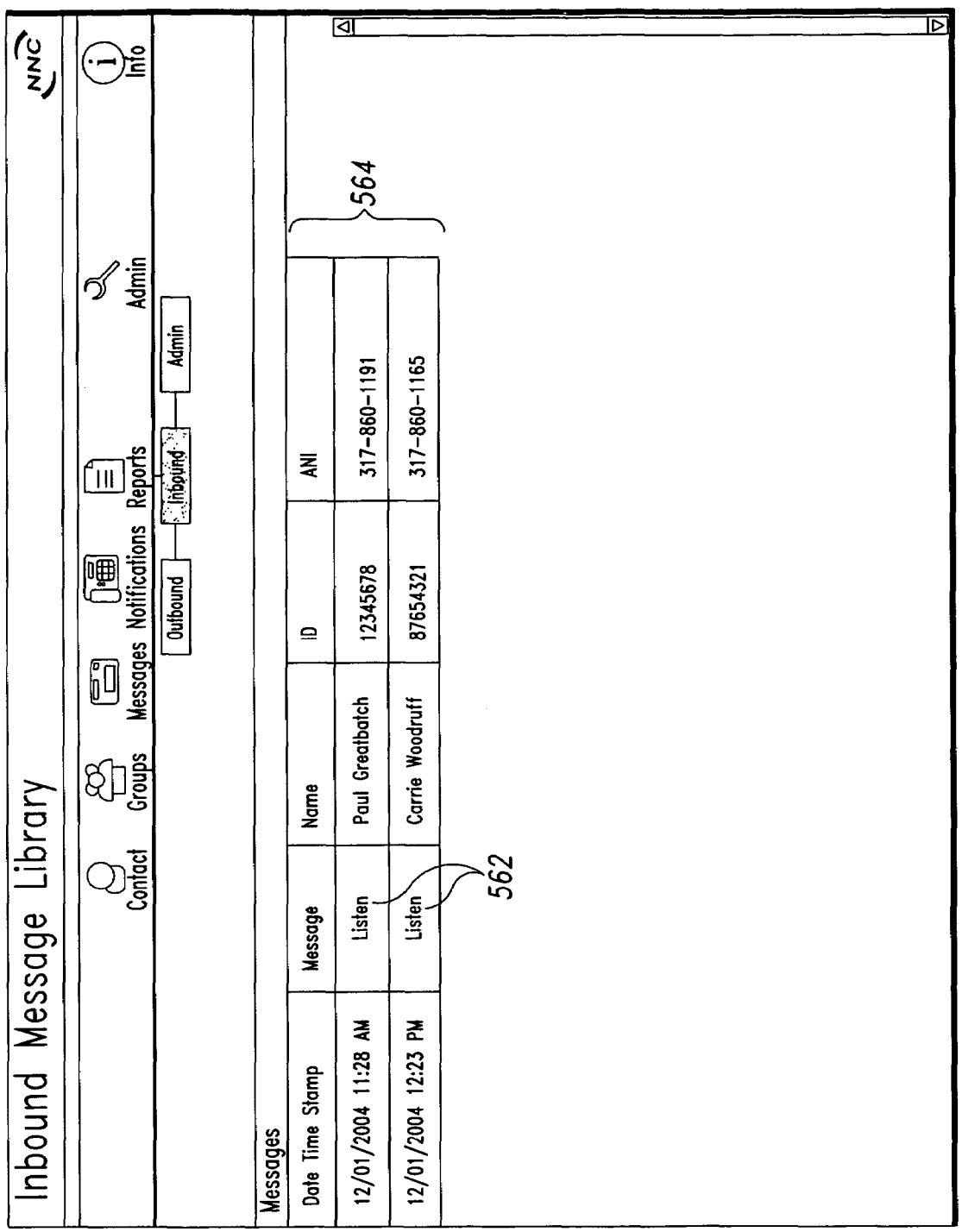

FIG. 23 illustrates message library report screen 560, which is shown in response to an activation of command link 555 in inbound call history report screen 550. Message library screen 560 includes a table listing each return message, including its date and time stamp, the name and contact identifier of the contact who left the message, and the automatic number identification (ANI) data for the telephone line with which the contact made that return call. Links 562 in table 564 enable the administrator to listen to the voice messages and view replies in text or document form.

Figure 24:
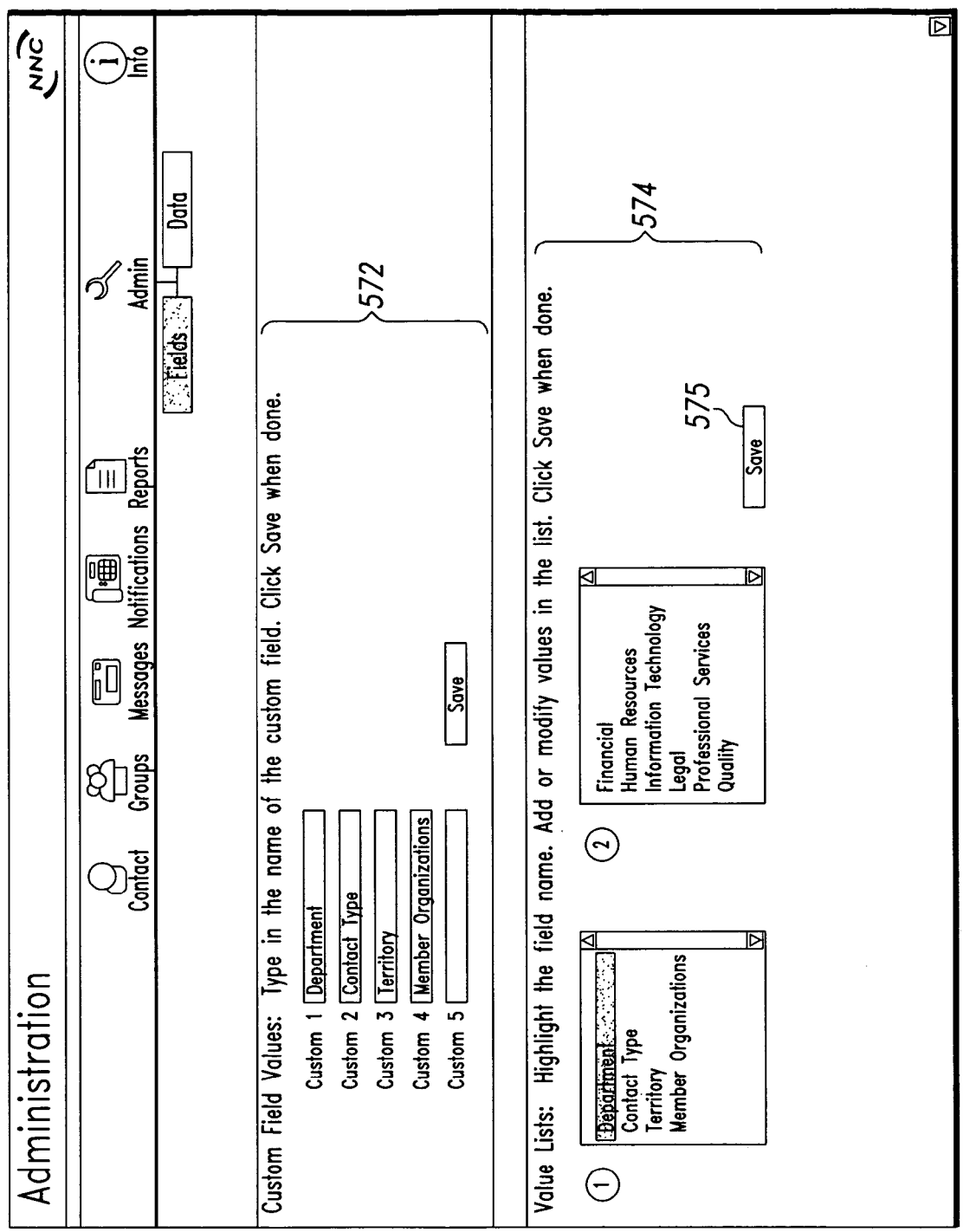

FIG. 24 illustrates an administrative configuration screen for fields 570, which includes custom field naming area 572 and custom field value area 574. In field name area 572, the administrator enters the names to be used as labels for the one or more custom fields being used in the system, while in custom field value area 574, the administrator provides a set of acceptable values for each of those fields. These values may be added using any interface technique suitable for specifying the relevant information, as would occur to those skilled in the art. When the collection of field names and values is complete, the administrator clicks the Save button 575, and the information is stored in contact database 140.

Figure 25:
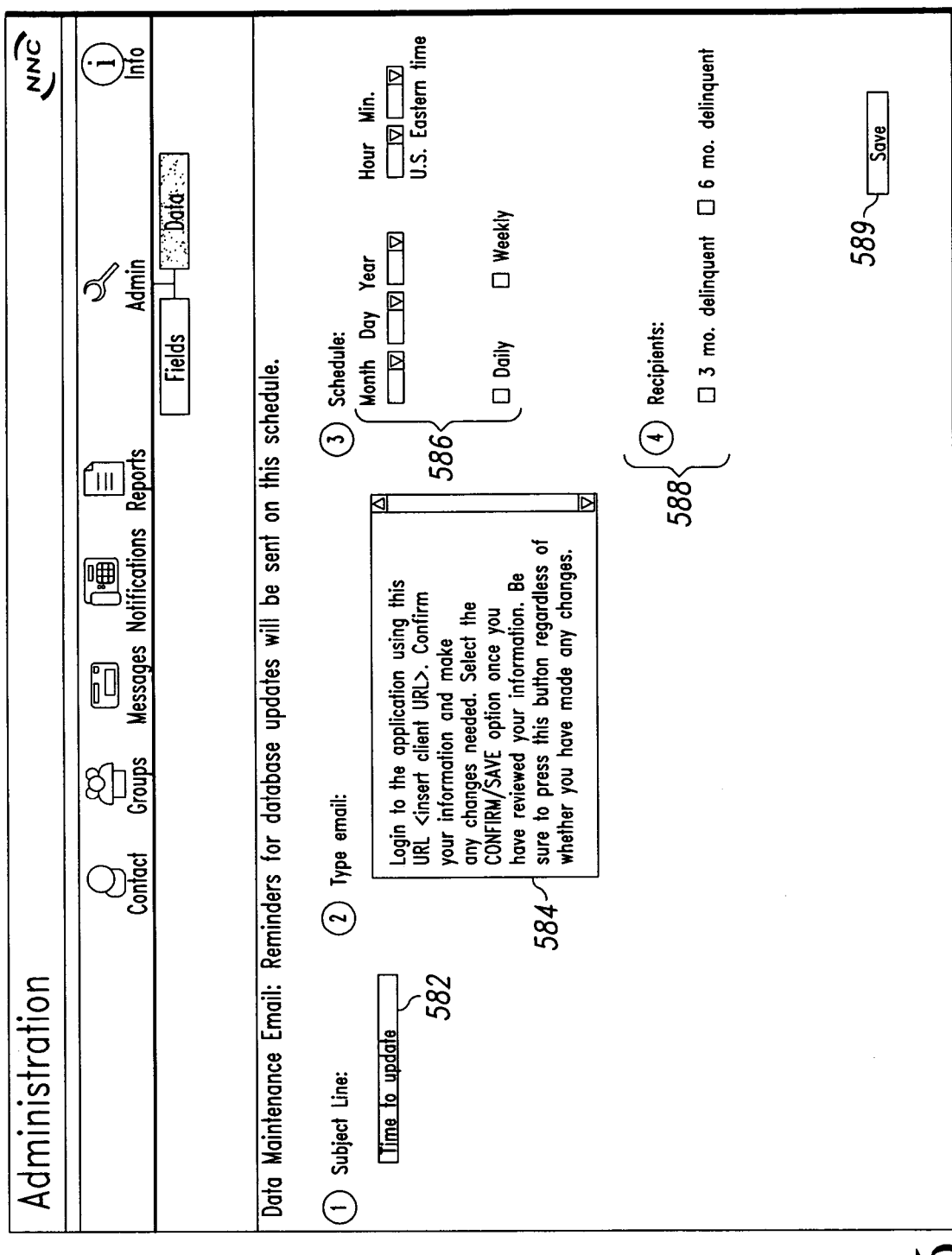

The administrative data maintenance configuration screen 580 is illustrated for the exemplary embodiment in FIG. 25. As mentioned elsewhere herein, the administrator uses data update reminder configuration screen 580 to configure a reminder for contacts to confirm or update their information periodically. The administrator adds the subject line for such messages in text field 582, and types the body of the message in text area 584. The information placed into text area 584 in some embodiments can include tags, macros, and the like for personalizing and/or formatting the e-mail message. The day and time at which the contact database will be checked, as well as the period for follow-up (daily or weekly in this example), are selected by the administrator in interface region 586. The amount of time allowed after a contact confirms or updates his or her information is configured in interface region 588 and is saved to nonvolatile storage when the administrator clicks Save button 589. Alternative embodiments use an automatically generated inter-office memorandum, e-mail message, voice mail message, or the like to remind users to confirm or update their stored information.

In the foregoing description, notification tasks were initiated either immediately upon completion of the task configuration or at a specified day and time. In various embodiments, the initiation of the notification task is triggered by a trigger event. In the above-described embodiment, the trigger event is the saving of the configuration information or the arrival or passing of a specific time. In other embodiments, the trigger event is manual activation of a pre-configured notification task by an administrator through a web interface, e-mail form, or the like, a physical "panic button," or the sending of a special signal via network 100. In other embodiments, the "trigger event" for beginning the notification task is the passing of a particular amount of time without the occurrence of a particular event, such as receipt of a signal by a processor in the system 100. For example, if a park ranger fails to check in for a period of three hours while he is on shift, the system could automatically issue a pre-configured notification message to alert rescue authorities to the situation. In another example, weather-related warning messages are monitored, and if they have certain content, then they trigger transmission of one or more preconfigured messages.

In some embodiments, the list of contacts to which a notification task's message(s) are to be sent is determined at the time the group is defined (as, perhaps, combined with other groups during definition of the notification task). In others, the contact selections in "contact groups" and criteria (in criteria groups) are applied when the notification task is defined. This arrangement takes into account updates in the contact database 140 that occur between group definition and specification of the notification task. In still other embodiments, the group selections and criteria definitions are applied at the time the notification task begins to transmit messages, and may even be updated as the messages are being transmitted to include or exclude contacts in light of new information received in the contact database.

As described above in relation to FIGS. 14-16, the illustrated embodiment facilitates separate selection of messages and/or documents to be transmitted via defined voice, fax, and text (e-mail) channels. While this division of communication channels into message types is useful in that it allows the system to take advantage of unique attributes of voice channels (for transmitting recorded voice, for example), e-mail (for transmitting messages in formats readable by hand-held computers, with or without additional attachments), and facsimile (substantially arbitrary images on multiple pages), other embodiments divide up the available message channels differently. For example, all voice channels might have a common configuration, while all other channels use a second, text-based configuration. In various embodiments, messages are assigned to particular communication channels for which they are (or can be translated or converted to be) suitable. In some embodiments, this distinction is made between text-based channels and voice- (or more generally audio-) based communication channels.

In some embodiments, the notification task configuration process (see FIGS. 12-17) includes storing an association between a set of contacts and the message(s) that will be sent to them, and storing another list of contacts in an association with the message(s) to be sent to them via another channel. These two sets of contacts are typically different (though they may overlap or even sometimes be the same), and are determined based on the communication channels that will be used for each.

Various embodiments implement the interactive filtering discussed above (in relation to FIGS. 20-21) in different ways. In some embodiments, the records for the contacts that do not meet the filter criterion(a) are removed from the display, while in other embodiments those records are shown in a different color. In still others, the filtering is shown visually by sorting and visually separating those that do and those that do not meet the criterion(a) within the table. Still other systems for presentation of the records will occur to those skilled in the art.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for communicating a message to a plurality of contacts, comprising:
    a first processor; and
    computer-readable memory in communication with the first processor, the memory containing:
        a group of contacts and, for each contact, information identifying one or more ways to communicate a message to said each contact; and
        programming instructions executable by the first processor;
    wherein the instructions are executable by the first processor:
        to attempt, automatically and responsively to a trigger event, to communicate a message to at least a selected subset of the contacts in the group using the information in the computer-readable memory;
        to display to a user the status of the attempting;
        interactively to filter the display based on a user-selected function of the completion status of each attempt; and
        responsively to a Renotify command from a user, to attempt again to contact one or more contacts shown in the filtered display.

2. The system of claim 1, wherein the list is stored in a relational database.

3. The system of claim 2, wherein the database is managed by a second processor that is in communication with the first processor via a network.

4. The system of claim 1, wherein the trigger event is a user command.

5. The system of claim 1, wherein the trigger event is the failure of the processor to receive a predetermined user command in a predetermined time interval.

6. The system of claim 1, wherein:
    the information identifying one or more ways to communicate the message to the contacts includes a channel type for each way to communicate a message to each contact; and
    the user-selected function is a function of both the completion status of each attempt and the channel type of each attempt.

7. The system of claim 1, wherein the display is a table having:
    a row for each contact to which the system is attempting to communicate the message; and
    a GUI widget with which a user can select the filter to apply to the display.

8. A method of disseminating emergency messages, comprising:
    storing a database of records that each hold information about a contact, wherein
        the records store the information in fields, and
        at least one field is a user-named data field capable of holding a user-defined value for each contact;
    identifying one or more criteria, including at least one criterion that is a function of the value in the user-defined data field, for selecting records from the database;
    saving the one or more criteria on a first day;
    retrieving the one or more criteria on a second day that comes some time after the first day; and
    after the retrieving, attempting to automatically communicate a message to the contacts to whom the one or more criteria apply.

9. The method of claim 8, wherein:
    the database also holds channel preference information that indicates a preference of at least one contact for one particular channel of communication over another channel of communication; and
    the attempting step uses the preferred channel of communication for the at least one contact whenever possible.

10. The method of claim 8, wherein:
    the database also holds channel preference information that indicates a preference of at least one contact for one particular channel of communication over another channel of communication; and
    the attempting step uses the preferred channel of communication for the at least one contact whenever possible, unless the preference is selectively overridden by a user.

11. The method of claim 8, wherein the storing occurs before the retrieving.

12. The method of claim 8, wherein:
    the saving step includes associating the one or more criteria with a criteria set name; and
    the retrieving step includes
        specifying the criteria set name, and
        loading the one or more criteria associated with the criteria set name.

* * * * *